2,933,522

PROCESS FOR THE PREPARATION OF HOMO-SERINE AND ALKYL ESTERS THEREOF

Richard D. Cramer, Landenberg, and William R. McClellan, Kennett Square, Pa., assignors to E. I. du Pont de Nemours and Company, Wilmington, Del., a corporation of Delaware No Drawing. Application November 20, 1957
Serial No. 697,534

9 Claims.  (Cl. 260—482)

The present invention relates to a novel method for the preparation of 2-amino-4-hydroxy butyric acid, otherwise known as homoserine. More particularly, the present invention relates to a process for the preparation of homoserine by the catalytic hydrogenation of isoxazole-3-carboxylic acid or its alkyl esters.

Homoserine may be conveniently isomerized to L-threonine by bacterial action, as described in detail on page 483 of McElroy and Glass "Amino Acid Metabolism," Johns Hopkins Press (1955). Nutritional studies have definitely established that L-threonine is one of the amino acids which is essential to the human diet. Prior processes for obtaining L-threonine from natural sources such as by the hydrolysis of casein or other proteins, and for preparing L-threonine synthetically have not been entirely satisfactory.

It is an object of the present invention to provide a novel process for the preparation of homoserine which may, in turn, be isomerized to L-thereonine. It is a further object of the invention to provide a process for the preparation of homoserine which is convenient to operate and economical to use. Other and additional objects will be apparent from the ensuing specification and claims.

Briefly stated, the novel process of the present invention involves the hydrogenation of isoxazole-3-carboxylic acid or an alkyl ester thereof in the presence of a metallic catalyst selected from group VIII of the periodic table. The reaction may be represented as follows:

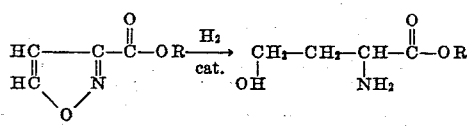

wherein R represents a hydrogen atom or an alkyl radical.

By one convenient method of operation, a pressure reactor is charged with an organic reaction medium, a group VIII metal catalyst, and either isoxazole-3-carboxylic acid or an alkyl ester thereof. The charged reactor is placed on an agitating rack equipped with heating means and hydrogen is then injected so that at a temperature in the range of 22–170° C. the reactor is under a positive pressure. After the reaction is complete, as evidenced by cessation of pressure drop, the reactor is opened and the contents discharged and filtered. In reactions involving the free acid, the filtrate is evaporated to dryness and the syrupy residue is taken up in methanol. If solid DL-homoserine does not form immediately, it will form on cooling. In reactions involving the ester, the reaction mixture is hydrolyzed and the free amino-acid is then obtained by methods well known to those skilled in the art, as illustrated in Example 2.

The invention will be better understood from a consideration of the following examples.

Example 1

A pressure reactor was charged with a solution of 3.6 g. of isoxazole-3-carboxylic acid in 60 cc. of glacial acetic acid and 0.75 g. of a 10% palladium-on-carbon catalyst. Hydrogen was then injected to 200 atmospheres and the charge heated so that a temperature of 50° C. was attained in 30 minutes, at the end of which time the reaction was complete. The solvent was removed from the product under reduced pressure (final pressure of 0.3 mm.) with a heating bath held at 75° C. There was 4.4 g. of a viscous syrup remaining that still retained an odor of acetic acid. This changed to a white solid on the addition of 30 cc. of absolute ethanol. The product was removed by filtration, washed with cold absolute ethanol, and air dried giving 1.4 g. of product, M.P. 161–172° C. with decomposition. Recrystallization from absolute methanol gave a product with a melting point of 174–179° C. The melting point of a mixture of this product and authentic DL-homoserine was 175–178° C.

Analysis.—Calculated for $C_4H_9NO_3$: C, 40.33; H, 7.62; N, 11.76; M.W., 119.1. Found: C, 41.90; H, 7.60; N, 11.30; M.W. 126 (titration of amine function).

Example 2

A pressure reactor was charged with 4 g. of 3-carbethoxyisoxazole in 80 cc. of absolute ethanol and 3 g. of alloy-skeleton nickel. The charged reactor was pressured with hydrogen to 167 atmospheres at ordinary room temperature. Under these conditions, reaction was complete within 1 hour, as evidenced by cessation of pressure drop. The bulk of the reaction product was reduced to a volume of 10 cc. by distillation under reduced pressure. A solution of 6 cc. of concentrated hydrochloric acid and 50 cc. of water was added, and this solution was held at 75° C. for 2.5 hours and then at 90–100° C. for 1 hour. An aliquot of the solution was analyzed by paper chromatography. For this work, paper spotted with known concentrations of authentic DL-homoserine and with a solution of the unknown was hung so that one edge dipped into a solution of 1 part of aqueous 0.1 M-potassium acetate, acetic acid buffered to pH 5.4, 2 parts of n-butanol, and 1 part of ethanol. After 1.5 hours, the paper was removed and sprayed with a solution of 10 mg. of ninhydrin, i.e. triketohydrindene hydrate, in 20 cc. of acetone. The color was developed by a short steam treatment. Analysis of the developed paper indicated that homoserine was present in the unknown, and the amount of it corresponded to about a 50% yield, based on the ester hydrogenated.

The bulk of the hydrolyzed solution was stirred with an excess of freshly precipitated silver oxide. The solids were removed by centrifuging, and the clear liquid was decanted and treated with hydrogen sulfide. The precipitate of silver sulfide was removed by centrifuging and the clear liquid was evaporated to dryness under reduced pressure. To avoid condensation reactions during the evaporation, the heating bath was kept below 70° C. The syrup remaining changed to a solid 0.9 g. (M.P. 174–178° C. with decomposition), on the addition of methanol. There was no depression of the melting point on mixing with authentic DL-homoserine.

Example 3

The procedure of Example 2 was repeated with a charge consisting of 5.55 g. of 3-carbethoxyisoxazole in 70 cc. of absolute ethanol and 2 g. of alloy-skeleton nickel catalyst at room temperature (ca. 22° C.) and 3 atmospheres of hydrogen pressure. Under these conditions 3 moles of hydrogen were absorbed per mole of carbethoxyisoxazole in 25 hours. Titration of an aliquot of the solution showed the amino group content to correspond to 65% of the theoretical for complete conversion to homoserine. The solution was accordingly divided into two equal parts. One part was heated to reflux and then concentrated but no solid separated on cooling. The addition of dry ether to the cool concentrate gave a moisture-sensitive precipitate. The other part of the solution was distilled to dryness under reduced pressure at 110° to 120° C. After heating under 1 mm. pressure for 20 minutes, the reactor filled with foam. After cooling and introducing air, many transparent, thin films formed in the flask. This polymeric product weighed 1.8 g. and was readily soluble in alcohol and water and appeared to be principally a low molecular weight polyamide from homoserine.

*Analysis.*—Calc'd for $C_4H_7NO_2$: C, 47.51; H, 6.98; N, 13.86. Found: C, 51.25; H, 6.85; N, 12.73; M.W. 1020.

The high carbon and low nitrogen values are probably due to the presence of ester end groups and of loss of some nitrogen through secondary amine formation.

According to the present invention homoserine is prepared by the catalytic hydrogenation of isoxazole-3-carboxylic acid and/or its alkyl esters. A detailed description of a process for the preparation of isoxazole-3-carboxylic acid may be found in copending application Serial No. 622,524, filed November 15, 1956, now U.S. Patent No. 2,855,402, in the name of R. D. Cramer and having a common assignee with the present application. Briefly, this process involves the synthesis of 3,3'-biisoxazole from acetylene and nitric oxide in the presence of acetonitrile. 3,3'-biisoxazole is oxidized in sulfuric acid solution directly to isoxazole-3-carboxylic acid with powdered potassium permanganate. The acid may be esterified directly, if desired, for example by diazoethane in the case of the ethyl ester.

The catalysts for the present process are the group VIII metals of the periodic table. Best results by far are obtained with nickel and palladium, and these two metals represent the much preferred catalysts for the process. Palladium is generally used for hydrogenation of the acid inasmuch as it is not attacked by the acid. A nickel catalyst is usually used for hydrogenation of the esters. Hydrogenation of the ester, of course, leads to the corresponding ester of homoserine from which the free amino acid may be obtained by hydrolysis, as is conventional in the art.

The catalyst must be present in an amount of at least about 5% by weight, based on the isoxazole-3-carboxylic acid or ester. Since the rate of hydrogenation is improved by increasing the catalyst concentration, it is preferable to have the catalyst present in amounts greater than 5%. Superior results are achieved with catalyst concentrations of 10–20%, by weight, and the latter represent the preferred embodiment of the invention.

Suitable palladium compounds for use as catalysts are the oxide, chloride, nitrate, etc., and the catalyst may be unsupported or supported on inert base materials. Compounds of palladium appear to be more or less completely reduced to palladium metal during use. Suitable supports are charcoal, alumina, silica, pumice, etc. The particle size of the support may vary from 40 to 300 mesh for use in fluidized systems, whereas for use in fixed bed operations, supports of larger particle size, e.g., 4 to 40 mesh are satisfactory.

A suitable palladium catalyst is prepared by depositing palladium chloride on granular activated coconut charcoal in amount sufficient to give a concentration of 0.2 to 20 g. of palladium per liter of catalyst. Preferably, the charcoal is subjected to pre-treatment with an acid, such as nitric acid, prior to contacting it with the palladium compound. A typical preparation is as follows:

A solution of 8.33 g. of palladium chloride in 5.5 ml. of concentrated hydrochloride and 40 ml. of water is prepared by heating the mixture on a steam bath. The resulting solution is poured into a solution of 135 g. of sodium acetate trihydrate in 500 ml. of water contained in a 1-liter reduction bottle. Forty-five grams of activated coconut charcoal is added and the mixture is hydrogenated until hydrogen absorption ceases, which is between 1 and 2 hours. The catalyst is collected on a suction filter and washed with 2 liters of water in five portions. The filter cape, after removal of most of the water, is dried in air and stored in a desiccator over calcium chloride. The catalyst, which weighs from 40 to 50 g. and contains about 10% palladium is stored, after being powdered, in a tightly closed container.

Nickel in the form of the stabilized or the pyrophoric metal, or as the oxide or salt can be used in place of palladium. Elementary nickel in the pyrophoric or stabilized state can be prepared by methods yielding the active form of the metal at temperatures below 150° C., or by reducing a salt, oxide, or hydroxide of the metal with hydrogen at temperatures in the range of 400–700° C. The pyrophoric metal may be stabilized by exposure to an oxidizing atmosphere under conditions such that the temperature of the catalyst is maintained below 50° C.

Pyrophoric nickel may be conveniently made by extracting with alkali the alkali-soluble metal or by reducing a nickel salt with sodium naphthalene, as described in U.S. Patent 2,177,412, issued October 24, 1939, in the names of N. D. Scott and J. F. Walker. The nickel catalyst may be supported or unsupported. The extender may be added during the catalyst preparation or it may be formed in situ. The preparation of a typical elementary nickel catalyst is illustrated below.

Three hundred grams of a finely divided alloy composed of equal parts of nickel and aluminum is added with stirring over a period of one and one-half hours to a solution of 342 g. of sodium hydroxide in 1590 g. of distilled water maintained at 50° C. The supernatant liquid is then removed by decantation and the catalyst washed with distilled water until it is free of alkali. The product is pyrophoric and it may be stabilized as follows.

The aqueous sludge is placed in a rotating vessel and the vessel is sealed, air is exhausted, and the mass is heated under vacuum until all the free water is removed. The vessel is then cooled continuously with cold water and a small amount of air is blown through the dry mass at such rate that the temperature of the dry mass does not exceed 50° C. After two hours, a sample of the dry product is no longer pyrophoric. The catalyst is found by analysis to consist of 37% nickel, of which 55% is in the elementary state, and 43% $Al_2O_3$. The catalyst probably consists of partially oxidized nickel supported on alumina.

Pressure is not a critical feature of the invention. Gaseous hydrogen is one of the reactants and would generally be fed into the reactor under a positive pressure. Completion of the reaction may be ascertained by the cessation of hydrogen pressure drop which occurs when the hydrogen has reacted with all the isoxazole-3-carboxylic acid or ester present. Elevated pressures tend to enhance the rate of reaction, and in this connection pressures as high as 500 atmospheres may be employed. Pressures higher than this are operable but are of no special advantage. For economy reasons, the process is generally operated at as low a pressure as will allow a practical rate of reaction at the temperature employed. At the more moderate pressures, the homoserine may polymerize to give a polypeptide composition. The monomeric amino acid can, of course, be obtained from the polypeptide by hydrolysis, as is well known in the art.

The process of the present invention is operable over a wide temperature range; the specific preferred temperatures selected depending upon a number of interdependent factors such as nature and amount of catalyst used, nature of the reaction medium, pressure, etc. Generally, temperatures below 170° C. and especially below 150° C. are employed since good yields of homoserine are achieved in this range at a practical reaction rate.

The hydrogenation is continued until complete as evidenced by a lack of pressure drop in the hydrogen atmosphere. Depending upon other conditions, the reaction will generally require anywhere from about ¼ to 30 hours. However, homoserine will obviously be obtained to some extent in shorter or longer reaction periods and therefore reaction time cannot generally be considered a critical factor with respect to the operability of the process.

The process may be conducted batchwise, continuously, or semi-continuously in the presence of an inert liquid reaction medium. Any organic liquid which is inert to the reactants and products is suitable including, for example, acetic acid, methanol, ethanol, cyclohexanol, dioxane, diethylether, etc. The particular reaction medium selected in any instance will depend to some extent upon the catalyst which is being used. With a base metal such as nickel, it is preferred to employ a monoalkanol like methanol or ethanol. With a noble metal catalyst, such as palladium, acetic acid is the preferred reaction medium. The amount of reaction medium is not critical and may be equal, on a weight-to-weight basis, to the amount of isoxazole-3-carboxylic acid or may exceed the weight of the latter by as much as a 100-fold, or more.

Having thus described the invention, it is intended to be limited only by the following claims.

We claim:

1. A process for the preparation of a compound from the group consisting of homoserine and the alkyl esters thereof which comprises hydrogenating a corresponding compound selected from the group consisting of isoxazole-3-carboxylic acid and the alkyl esters thereof in the presence of a group VIII metal catalyst.

2. A process for the preparation of a compound from the group consisting of homoserine and the alkyl esters thereof which comprises hydrogenating a corresponding compound selected from the group consisting of isoxazole-3-carboxylic acid and the alkyl esters thereof in an inert organic reaction medium and in the presence of a group VIII metal catalyst.

3. A process for the preparation of a compound from the group consisting of homoserine and the alkyl esters thereof which comprises hydrogenating a corresponding compound selected from the group consisting of isoxazole-3-carboxylic acid and the alkyl esters thereof in an inert organic reaction medium and in the presence of a metal catalyst selected from the group of nickel and palladium.

4. A process for the preparation of a compound from the group consisting of homoserine and the alkyl esters thereof which comprises hydrogenating a corresponding compound selected from the group consisting of isoxazole-3-carboxylic acid and the alkyl esters thereof in an inert organic reaction medium and in the presence of a nickel catalyst.

5. A process as in claim 4 wherein the reaction medium is methanol.

6. A process as in claim 4 wherein the reaction medium is ethanol.

7. A process for the preparation of homoserine which comprises hydrogenating isoxazole-3-carboxylic acid in an inert organic reaction medium and in the presence of a palladium catalyst.

8. A process as in claim 7 wherein the reaction medium is acetic acid.

9. A process for the preparation of an alkyl ester of homoserine which comprises hydrogenating the corresponding alkyl ester of isoxazole-3-carboxylic acid in an inert organic reaction medium and in the presence of a nickel-containing catalyst.

References Cited in the file of this patent

D'Alcontre: Chem. Abs., vol. 45, cols. 3837–9 (1951).